Dec. 8, 1970    E. FRANKL    3,546,040
METHOD OF MAKING THREE-DIMENSIONAL OBJECTS FROM POLYSTYRENE
Filed May 16, 1967

Inventor
Ernest Frankl
by Roberts, Cushman & Grover
Att'ys

United States Patent Office 3,546,040
Patented Dec. 8, 1970

3,546,040
METHOD OF MAKING THREE-DIMENSIONAL OBJECTS FROM POLYSTYRENE
Ernest Frankl, Middleboro, Mass., assignor to Winthrop-Atkins Co., Inc., Middleboro, Mass., a corporation of Massachusetts
Filed May 16, 1967, Ser. No. 638,985
Int. Cl. B32b 31/18
U.S. Cl. 156—250                      5 Claims

ABSTRACT OF THE DISCLOSURE

Making three-dimensional figures or objects by adhesively attaching a pattern sheet, corresponding in plan to the figure or object to be reproduced, to one side of a sheet of polystyrene foam, and cutting through the sheet around the edge of the pattern using the latter as a guide to separate from the sheet the portion thereof to which the pattern is attached.

BACKGROUND OF THE INVENTION

It is not new to cut three-dimensional figures or objects from a sheet of polystyrene foam or equivalent material by cutting through the sheet with a sharp instrument or heated wire following, for this purpose, a tracing on the sheet or a pattern temporarily held against the sheet. The fidelity of the figures or objects thus formed depends largely upon the manipulative skill of the individual and hence in many instances it is quite recognizable. Furthermore, since the surface of the polystyrene foam sheet is generally absorptive and quite uneven completing the figure or object by painting or coloring the figure or object appropriately is generally unsatisfactory. The purpose of this invention is to make it possible for an unskilled person to cut figures from sheet polystyrene foam and the like of simple or intricate configuration quickly and easily with the details of the figure or object already depicted on its face.

SUMMARY

As herein illustrated, the method comprises applying a pattern corresponding in profile to the figure or object to be formed to sheet material susceptible of hot melt cutting, employing a pattern material which is resistant to melting, and progressively moving a low temperature wire through the sheet material at right angles to the plane of the pattern, using the latter as a guide to cut from the material a three-dimensional figure or object corresponding in profile to the pattern which has applied to one side of it the pattern. For this purpose, the pattern is provided on one surface with a design depicting the figure or object which is to be formed and on its other surface with an adhesive by means of which it may be attached to the sheet material. The pattern sheet is preferably provided with a pressure-sensitive adhesive and the sheet material to which it is attached is preferably a rigid or flexible dimensionally stable polystyrene foam.

The invention will now be described in greater detail with reference to the accompanying drawings wherein.

Figure 1:
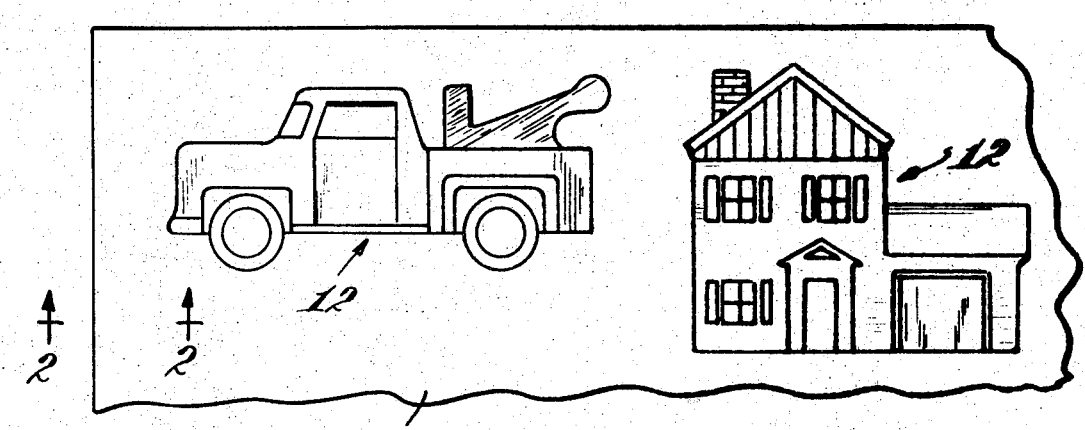
FIG. 1 is a plan view of a sheet of flexible material such as paper having printed on it a plurality of figures or objects, each of which is separable from the sheet.
Figure 2:
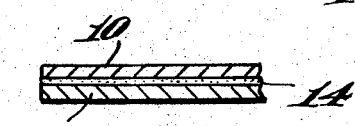
FIG. 2 is a section through the sheet shown in FIG. 1, illustrating the top layer on which the figures or objects are depicted, a pressure-sensitive adhesive layer, and a protective layer.

Referring to the drawings, there is shown a facing sheet of material 10 comprised of paper or its equivalent on which are printed and depicted in appropriate colors one or more patterns 12 representing conventional, fanciful and/or decorative figures or objects. The material 10 has on its back side a layer of pressure-sensitive adhesive 14 and this is covered by a protective sheet 16 which may be stripped off to expose the pressure-sensitive adhesive. The composite structure comprised of the facing sheet of paper 10 on which the figures or objects are printed, the pressure-sensitive adhesive 14 and the protective sheet 16 are partially cut through in accordance with conventional practice peripherally of each figure or object to enable removing them from the composite structure by the simple expedient of applying sufficient pressure to break them away.

Figure 3:
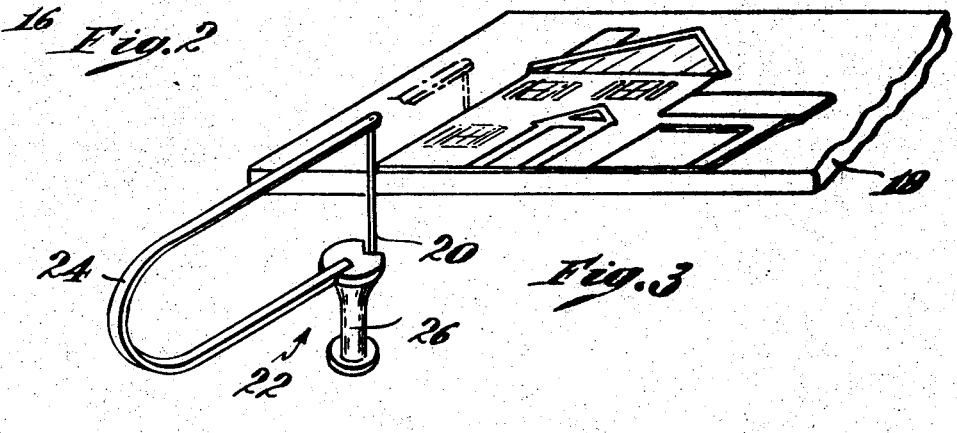
FIG. 3 is an isometric of a rigid sheet of polystyrene foam with a pattern removed from the sheet shown in FIG. 1 applied to its surface and showing an implement by means of which the sheet of polystyrene foam may be cut to remove a portion therefrom corresponding in configuration to the pattern applied to its surface.

In accordance with this invention, a pattern 12 is removed from the composite structure, the protective sheet 16 is stripped from the pressure-sensitive layer 14 and the pattern comprised of the paper facing 10 on which is printed the figure or object to be reproduced with the adhesive layer 14 on its rear side is adhesively attached to one face or surface of a sheet of polystyrene foam 18, as shown in FIG. 3. Preferably this polystyrene foam is rigid, dimensionally stable and relatively thick in comparison to the paper 10; for example, but without limitation it may be in the order of one-half inch thick so that a figure or object cut therefrom corresponding in profile to the pattern applied to its surface will be three-dimensional in character. The edge of the pattern is used as a guide for cutting a figure or object corresponding in profile thereto from the polystyrene foam with the aid of a relatively fine hot wire 20 supported in a holder 22 of the kind shown and described in my pending application Ser. No. 538,267, filed Mar. 29, 1966, and now abandoned.

Figure 4:
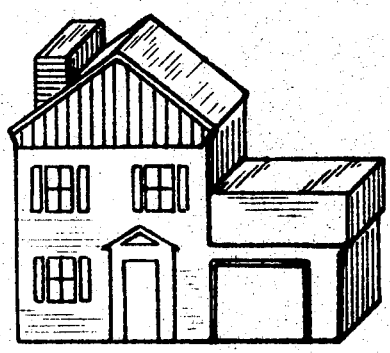
FIG. 4 shows the completed three-dimensional figure or object removed from the polystyrene foam sheet.

The implement shown in the aforesaid application comprises a fine wire 20 supported between the ends of a bow 24, one end of which is attached to a handle 26 containing a dry battery electrically connected to the wire so as to heat the wire. The temperature required for cutting through the polystyrene foam is comparatively low so that cutting is accomplished without burning or otherwise damaging the pattern itself. The pattern serves as a guide which enables faithfully reproducing the profile of the figure or object even though it may be quite intricate in configuration and results in a figure or object of three-dimensional character as shown in FIG. 4, which has adhered to its surface the pattern by means of which it was formed and which as previously indicated depicts in appropriate color and design the figure or object of which it is representative. Thus there is avoided the difficulty and/or necessity of coloring and/or painting the figure or object removed from the polystyrene sheet after it is cut therefrom which may be difficult and not entirely satisfactory because of the irregularity and absorptive character of its surface.

Figure 5:
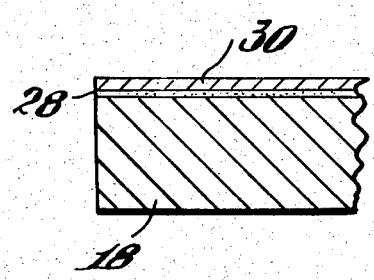
FIG. 5 is a fragmentary section through the polystyrene foam shown with a pressure-sensitive adhesive on its back side and a protective covering therefor.

Optionally, the rear side of the sheet of polystyrene foam may have applied to it a pressure-sensitive adhesive 28 (FIG. 5) and a protective sheet 30, the latter being of a material which is susceptible of cutting by means of the hot wire simultaneously with cutting the polystyrene foam. As thus provided, when the figure or object is removed the protective sheet 30 may be stripped off and the figure or object with the pressure-sensitive adhesive on its rearside adhesively attached to a wall or other surface.

Although the pattern sheet is described as being comprised of paper any other appropriate sheet material may be employed susceptible of printing, embossing or otherwise illustrating a figure or object.

Additionally, the sheet material from which the figure or object is to be formed may be comprised of any dimensionally stable, flexible or rigid material susceptible of being cut by pressure of a relatively low temperature fine wire held against it and pressed in the direction of the profile of a pattern applied to its surface.

As specified in the aforesaid application a wire for cutting is used which is in the order of .006 to .008 inch in diameter and a 1½ volt battery suffices to heat the the wire sufficiently to cut the polystyrene rapidly and cleanly.

It should be understood that the present disclosure is for the purpose of illustration only and that this invention includes all modifications and equivalents falling within the scope of the appended claims.

I claim:

1. The method of making three-dimensional objects comprising providing patterns of predetermined configuration having on one broad side pressure-sensitive adhesive and on the other broad side a depiction appropriate to the subject matter of the pattern, securing the pattern to one broad side of sheet material of a thickness corresponding to the thickness of the object to be formed by pressing the adhesive-coated side of the pattern against said broad surface, said sheet material being susceptible of hot melt cutting and said pattern being comprised of a material resistant to melting, and progressively moving a hot wire through the sheet material at right angles to the plane of the pattern and along a path guided by the edge of the pattern to cut therefrom an object corresponding in configuration to the pattern comprising the sheet material cut to said configuration with the pattern adhesively attached to said one side.

2. A method according to claim 1, comprising providing the pattern with a removable covering sheet which may be stripped from the adhesive thereon to enable attaching the pattern to the sheet material.

3. A method according to claim 1, comprising employing a sheet material comprised of polystyrene foam which is dimensionally stable.

4. A method according to claim 1, comprising employing sheet material to one side of which is applied a pressure-sensitive adhesive and applying the pattern to the other side.

5. A method according to claim 1, comprising employing a sheet material to one side of which is applied a pressure-sensitive adhesive and a protective sheet which is susceptible of being cut by means of the hot wire simultaneously with the cutting of the sheet material itself.

References Cited

UNITED STATES PATENTS

| | | | |
|---|---|---|---|
| 2,281,027 | 4/1942 | Dennison | 156—267 |
| 2,710,046 | 6/1955 | Markus et al. | 156—290X |
| 2,874,500 | 2/1959 | Patterson | 156—267 |
| 3,297,856 | 1/1967 | Gershon | 83—171X |

VERLIN R. PENDEGRASS, Primary Examiner